(12) United States Patent
Ehrlich

(10) Patent No.: US 6,505,883 B1
(45) Date of Patent: Jan. 14, 2003

(54) FIBERGLASS REINFORCED PANEL REFRIGERATED TRAILER

(75) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 10/002,027

(22) Filed: Nov. 15, 2001

Related U.S. Application Data

(60) Provisional application No. 60/248,919, filed on Nov. 15, 2000.

(51) Int. Cl.[7] .............................................. B62D 33/04
(52) U.S. Cl. ....................................... 296/181; 296/183
(58) Field of Search .................................. 296/181, 183, 296/203.03

(56) References Cited

U.S. PATENT DOCUMENTS

| | | | | |
|---|---|---|---|---|
| 2,363,170 A | * | 11/1944 | Fontaine | 296/181 |
| 4,546,969 A | * | 10/1985 | Wilson | 296/183 X |
| 4,874,184 A | * | 10/1989 | Boyer | 296/181 X |
| 5,509,715 A | * | 4/1996 | Schmidt | 296/181 |
| 5,613,726 A | * | 3/1997 | Hobbs et al. | 296/181 |

* cited by examiner

*Primary Examiner*—Joseph D. Pape
(74) *Attorney, Agent, or Firm*—Trexler, Bushnell Giangiorgi, Blackstone & Marr, Ltd.

(57) ABSTRACT

A refrigerated trailer includes a floor and a pair of sidewalls which extend upwardly from the floor. Each sidewall is formed of inner and outer skins and a plastic core provided therebetween. A plurality of posts are also provided between the inner and outer skins. The posts have predetermined heights which vary along a predetermined pattern along the length of the trailer.

25 Claims, 3 Drawing Sheets

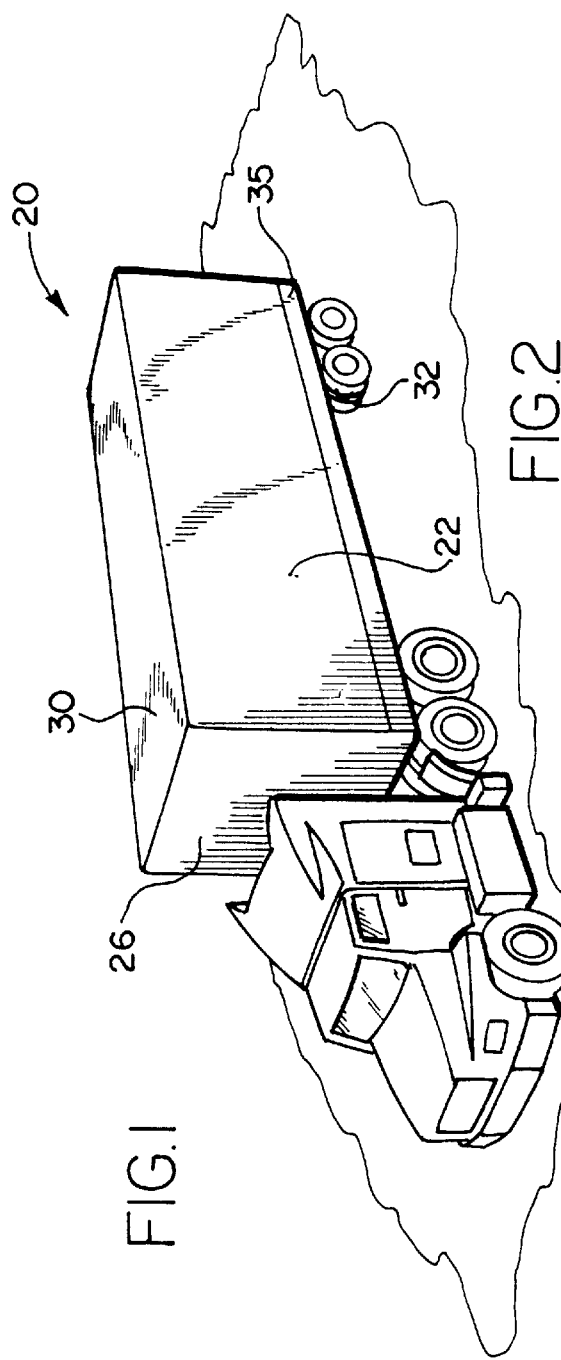
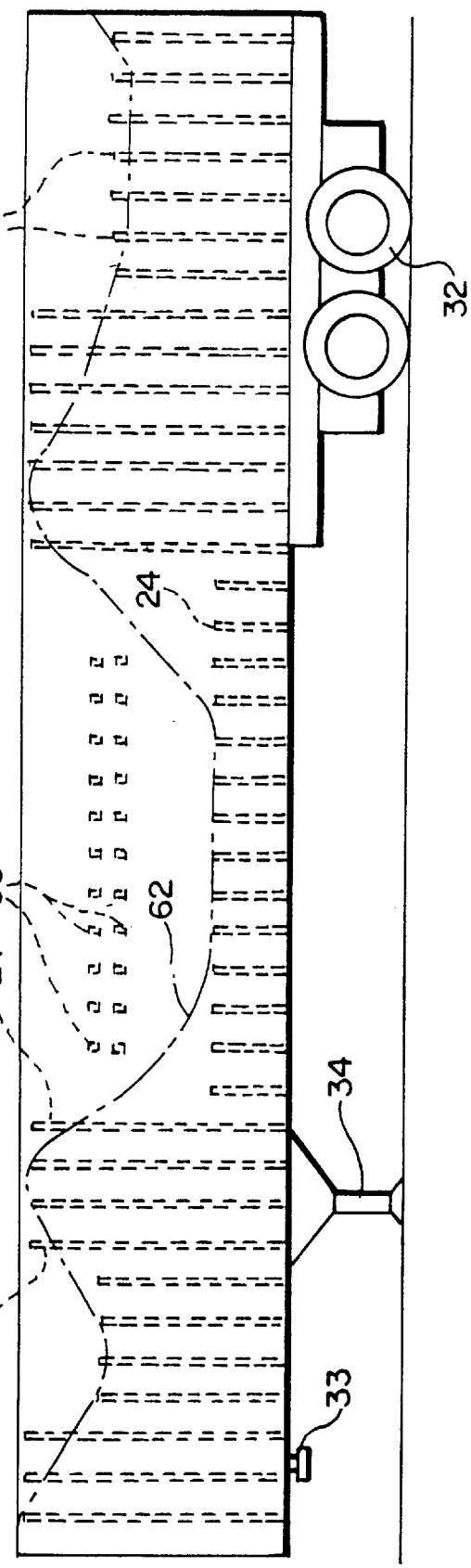

FIBERGLASS REINFORCED PANEL REFRIGERATED TRAILER

This application claims the priority of U.S. provisional application Ser. No. 60/248,919 filed on Nov. 15, 2000 and entitled "Fiberglass Reinforced Panel Refrigerated Trailer".

BACKGROUND OF THE INVENTION

This invention is generally directed to a novel thermally efficient refrigerated trailer. More particularly, the invention contemplates a novel thermally efficient refrigerated trailer which has minimized weight versus prior art trailers.

Some prior art refrigerated trailers have used aluminum side walls with aluminum posts inside the foam insulation. The metal side walls are not thermally efficient, and as a result, the effectiveness of the cooling is inefficient. In addition, these prior art refrigerated trailers are heavy.

The present invention provides a thermally efficient refrigerated trailer which overcomes the disadvantages of the prior art. Other features and advantages of the present invention will become apparent upon a reading of the attached specification in combination with a study of the drawing.

OBJECTS AND SUMMARY OF THE INVENTION

A general object of the present invention is to provide a novel thermally efficient refrigerated trailer.

An object of the present invention is to provide a novel thermally efficient refrigerated trailer which has minimized weight versus prior art trailers.

Briefly, and in accordance with the foregoing, the present invention discloses a novel refrigerated trailer which includes a floor and a pair of sidewalls which extend upwardly from the floor. Each sidewall is formed of an inner skin, an outer skin and a thermoset plastic core, preferably a urethane foam, provided therebetween. A plurality of posts are also provided between the inner and outer skins. The posts have predetermined heights which vary along a predetermined pattern along the length of the trailer.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a perspective view of a trailer which incorporates the features of the invention;

FIG. 2 is a side elevational view of the trailer showing the posts in phantom line;

DETAILED DESCRIPTION OF THE ILLUSTRATED EMBODIMENT(S)

Figure 3:
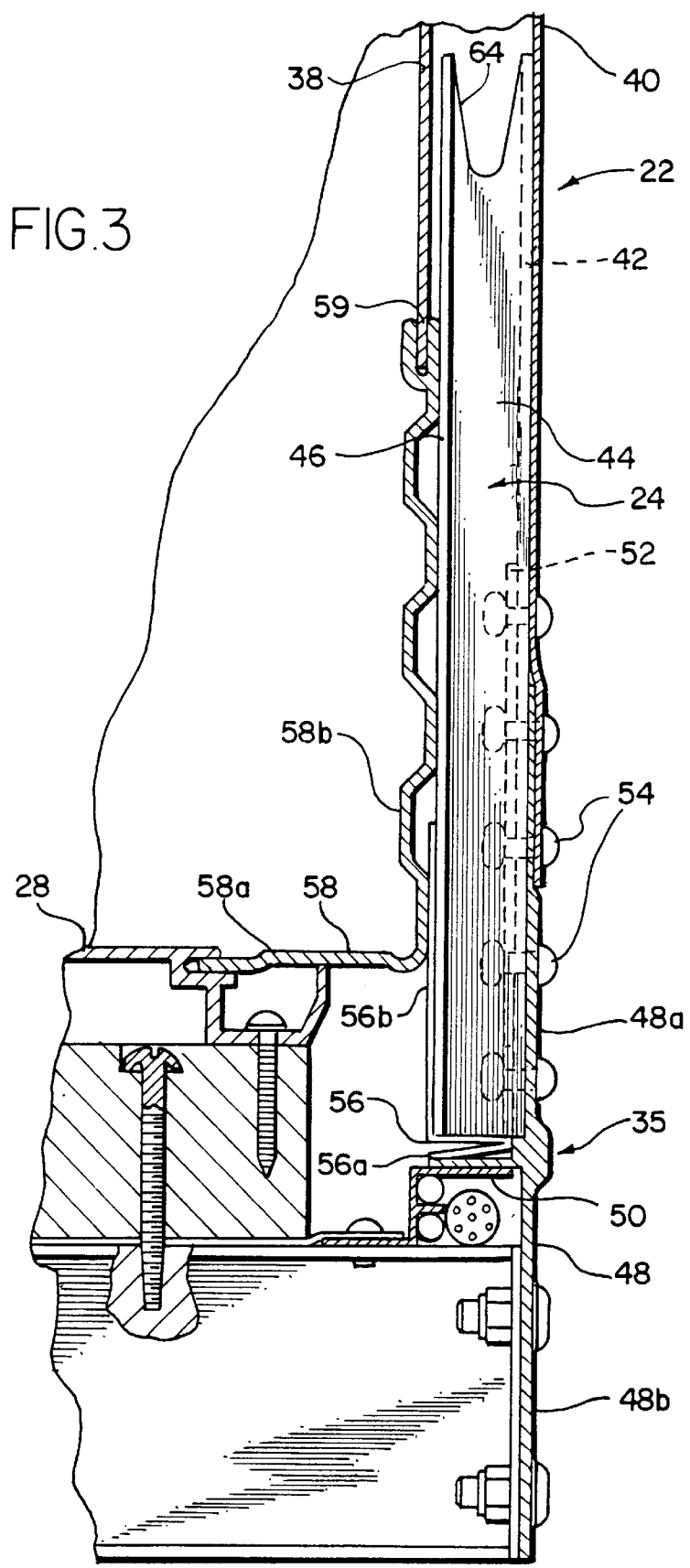
FIG. 3 is a cross-sectional view of one of the sidewalls of the trailer.
Figure 4:
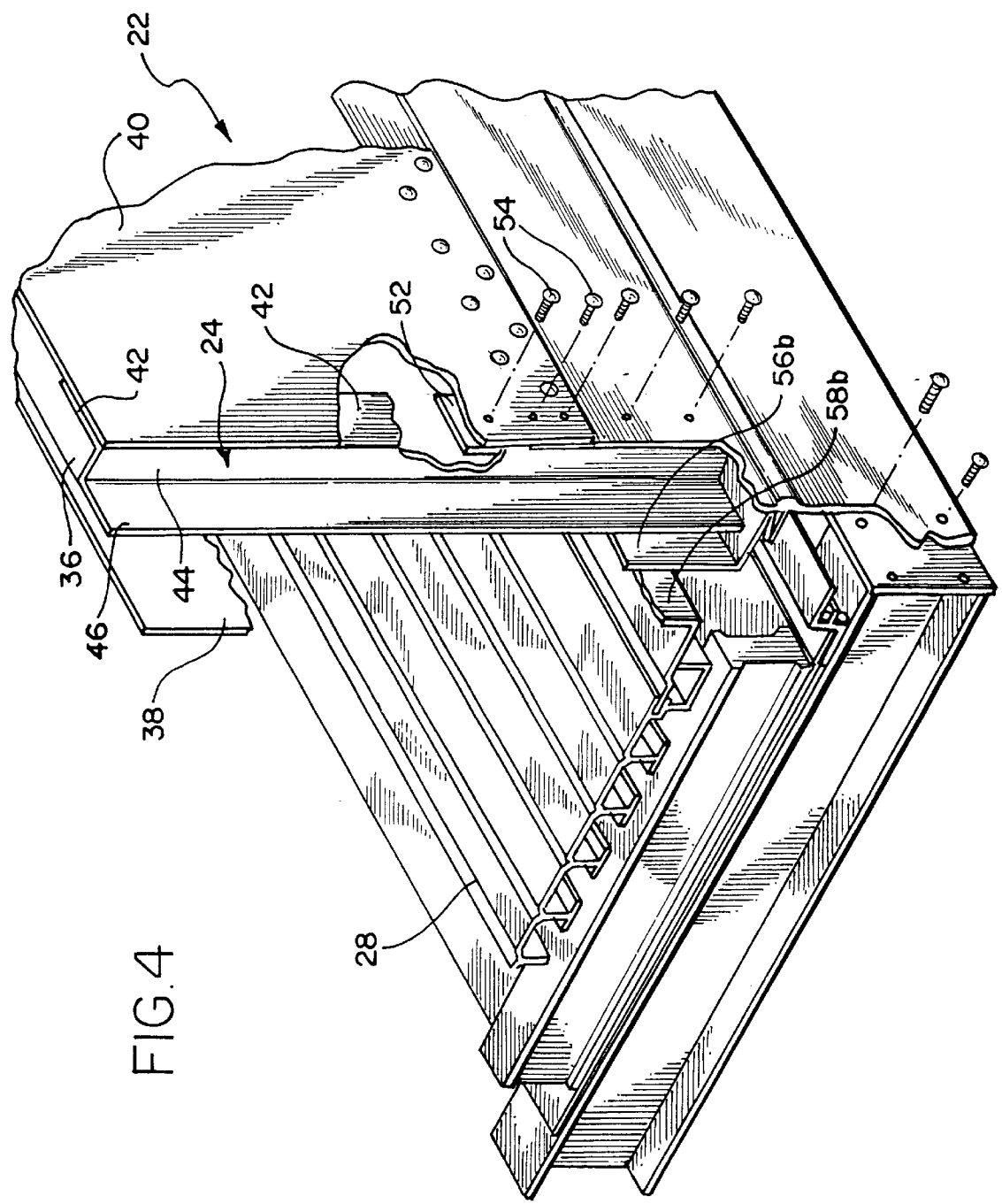
FIG. 4 is a perspective view of a portion of one of the trailer sidewalls.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a novel refrigerated trailer 20 which has improved thermal characteristics over prior art refrigerated trailers and is lightweight compared to prior art refrigerated trailers. The trailer 20 of the present invention has composite sidewalls 22 which have a plurality of posts 24 therein for absorbing the compression load placed on the trailer 20 over the length thereof as the trailer 20 travels over the roads. The heights of the posts 24 are minimized along the length of the trailer 20 to reduce the weight of the trailer 20 and to thermal conductivity which results from the usage of the posts 24.

The trailer 20 includes a body formed from a pair of rectangular sidewalls 22 and a front wall 26 which extend upwardly from a floor 28, rear doors (not shown), and a top panel or roof 30. The rear portion of the floor 28 is supported by a conventional rear undercarriage assembly 32. The front portion of the floor 28 has a conventional landing gear 34 secured thereunder. A conventional fifth wheel attachment 33 is provided forward of the landing gear 34. The top panel 30 and an upper portion of each sidewall 22 is secured to a respective upper rail in a conventional manner. The floor 28 and a lower portion of each sidewall 22 is secured to a respective lower rail 35 as described herein. The upper rail and the lower rail 35 are made or a suitable material such as aluminum.

Each sidewall 22 includes a core 36 provided between an inner thin skin 38 and an outer thin skin 40. The inner skin 38 is made of fiberglass and the outer skin 40 is preferably made of fiberglass. Fiberglass is preferable for use in the construction of the refrigerated trailer 20 as the outer skin 40 because it has a low modulus of elasticity, a lower yield strength, and provides for eye-pleasing outer look when the outer skin 40 is patched after damage. Metal is not suitable for use for forming the inner skin 38 as metal is a thermal conductor, but may be used as the outer skin 40. It is to be understood that an outer skin made of metal is not as suitable as fiberglass. The core 36 is made of a foamed thermoset plastic core, preferably a urethane foam, which is foamed into place once the construction of the other components of the sidewall 22, as described herein, are completed.

The posts 24 are generally mounted between the inner and outer skins 38, 40 of the sidewalls 22 and are spaced approximately sixteen inches apart from each other along the length of each sidewall 22. Each post 24 is integrally formed of suitable non-conductive material, such as fiberglass pultrusion or polyester pultrusion. Each post 24 is generally "Z" shaped and extends vertically along a predetermined portion of the height of the sidewall 22 as described herein. Each post 24 includes a first leg 42 which is parallel to the inner and outer skins 38, 40, a second leg 44 which extends perpendicularly to the first leg 42, and a third leg 46 which extends perpendicularly to the second leg 42 and is parallel to the first leg 42 and to the inner and outer skins 38, 40. A lower portion of each post 24 extends beyond the lower end of the inner and outer skins 38, 40 a predetermined distance, see FIG. 3.

Each lower rail 35 extends the length of the respective sidewall 22. The connection of the sidewall 22 and the lower rail 35 is described with respect to one side of the trailer 20 with the understanding that the other side of the trailer 20 is identical. Each lower rail 35 has a vertical portion 48 and a horizontal portion 50 at approximately a midpoint thereof which separates the vertical portion 48 into an upper vertical portion 48a and a lower vertical portion 48b. The horizontal portion 50 sits under the bottom end of each post 24 and spaced a predetermined distance therefrom. The upper vertical portion 48a of the lower rail 35 abuts against the lower portion of each first leg 42 and extends upwardly therefrom and is provided between the first leg 42 of each post 24 and a bottom portion of the outer skin 40. That is, the bottom portion of the outer skin 40 overlays the upper end of the lower rail 35.

A backer plate 52 is mounted on the inner side of the first leg 42 of each post 24 and extends from the bottom of the first leg 42 to a distance which is above the point where the outer skin 40 overlaps the upper vertical portion 48a of the lower rail 35. The backer plate 52 is formed of steel or aluminum.

To secure the outer skin 40, the lower rail 35, the respective posts 24 and the respective backer plates 52 together, a plurality of fasteners 54, such as rivets, are provided (the fasteners 54 are not shown in FIG. 1). The connection of these components is described with respect to one post 24 and backer plate 52, with the understanding that the connection of other posts 24, backer plates 52, the outer skin 40 and the lower rail 35 is the same.

The fasteners 54 are vertically aligned with each other. A first pair of lower fasteners 54 extend through the lower rail 35, the first leg 42 of the post 24, and the backer plate 52. The lower fasteners 54 are vertically spaced apart from each other. A second pair of intermediate fasteners 54 extend through the lower rail 35, the outer skin 40, the first leg 42 of the post 24, and the backer plate 52. The intermediate fasteners 54 are vertically spaced apart from each other and the lower intermediate fastener 54 is vertically spaced from upper lower fastener 54. An upper fastener 54 is mounted above the lower rail 35 and extends through the outer skin 40, the first leg 42 of the post 24 and the backer plate 52. The upper fastener 54 is vertically spaced from the upper intermediate fastener 54. The upper fastener 54 prevents peel of the outer skin 40 from the post first leg 42. In addition, the backer plate 52 prevents the post 42 from pulling through the outer skin 40 or from splitting. Each fastener 54 is capable of 700–800 lbs. of load placed thereon. The attachment of the outer skin 40 on the outside of the lower rail 35 allows the exterior of the trailer 20 to be easily repaired.

A foam seal 56 is provided on each sidewall 22 and extends the length thereof. Each foam seal 56 is formed of vinyl and has a generally V-shaped, horizontal portion 56a which is between the bottom end of each post 24 and the horizontal portion 50 of each lower rail 35 and a vertical portion 56b which is generally perpendicular thereto and extends upwardly therefrom. The vertical portion 56b sits against the third leg 46 of each post 24.

A generally L-shaped member 58 seals each side of the floor 28 to the respective side wall 22. The member 58 is formed of extruded aluminum. The member 58 extends along the length of each sidewall 22. Each member 58 has a horizontal scuff leg 58a which is welded to the floor 28, and a vertical scuff leg 58b which abuts against the vertical portion 56b of the foam seal 56 and against the third legs 46 of the posts 42. The vertical scuff leg 58b overlays an upper portion of the vertical portion 56b of the foam seal 56 and extends a predetermined distance upwardly from an upper end of the vertical portion 56b and abuts against the third legs 46 of the posts 42. The vertical scuff leg 58b of the member 58 is corrugated. The inner skin 38 of the respective sidewall 22 inserts into a recess 59 formed in the top of the vertical scuff leg 58b of the member 58 and is secured thereto by the adhesion provided by the foam in place process. As a result, the bottom end of the sidewall 22 is sealed by the horizontal portion 56a of the foam seal 56 and the lower portion of the sidewall 22 is sealed by the vertical portion 56b of the foam seal 56 and the connection of the foam seal 56, the member 58 and the inner skin 38. The vertical scuff leg 58b prevents a forklift from damaging the sidewall 22 during loading and unloading of cargo.

As seen in FIG. 3, the inner skin 38 is spaced from the post 42 such that a gap is formed. When the core 36 is foamed into place, the inner skin 38 is bonded to the post 42 and the portion of the third leg 46 of each post 24 which abuts the inner part of the vertical scuff leg 58b is bonded thereto. As such, each post 24 spans the entire thickness of the sidewall 22 where high impact may occur at the member 58. Because each post 24 is integrally formed of suitable non-conductive material, such as fiberglass pultrusion or polyester pultrusion, a low conductivity is provided as opposed to metal reinforcing as used in prior art trailers.

The height of the posts 24 along the length of the trailer 20 varies along a predetermined pattern. The posts 24 above the fifth wheel attachment 33 and the posts 24 above the landings gear 34 are longer than the posts 24 therebetween. The posts 24 above the landing gear 34 and the posts 24 above the rear undercarriage assembly 32 are longer than the posts 24 therebetween. Longer 24 posts are needed at the points of the fifth wheel attachment 33, the landing gear 34 and the rear undercarriage assembly 32 in order to absorb the compression loads placed on the sidewalls 22 during use of the trailer 20. The posts 24 between the landing gear 34 and the undercarriage assembly 32 do not need to be as long as posts 24 above the landing gear 34 and the undercarriage assembly 32 as lesser compression load are placed on the sidewalls 20 at those points. The approximate heights of the posts 24 are shown in FIG. 2. FIG. 2 also shows a diagram of the stress loading on the trailer 20 as indicated by the line 62. The upper end of each post 24 has a cutout 64 therein, see FIG. 3, which provides a stress relief for relieving the peel load placed on the top of the post 24 as a result of the connection of the post 24 to the outer skin 40. By shortening the height of the posts 24 between the landing gear 34 and the undercarriage assembly 32 thereby only providing the core 36 therebetween, the thermal efficiency of the sidewalls 22 is greatly improved over prior art trailers. In addition, shortening the posts 24 reduces the weight of the trailer 20 compared to prior art trailers.

A pail of spaced apart reinforcements 66 can be mounted above each short post 24 provided between the landing gear 34 and the undercarriage assembly 32 along an upper portion of the sidewall 22. A recessed logistics rail (not shown) can be attached to the reinforcements 66. Each pair of reinforcements 66 is aligned with and vertically spaced from a respective short post 24. Each reinforcement 66 is generally "Z" shaped. Each reinforcement 66 includes a first leg that is parallel to the inner and outer skins a second leg which extends perpendicularly to the first leg, and a third leg which extends perpendicularly to the second leg and is parallel to the first leg and to the inner and outer skins. The first leg of each reinforcement 66 is bonded to the outer skin 40 by adhesive. The third leg of each reinforcement 66 is bonded to the inner skin 38 by adhesive. As such, each reinforcement 66 spans the entire thickness of the sidewall 22 at the recessed area for the logistics rail. Each reinforcement 66 is integrally formed of suitable non-conductive material, such as fiberglass pultrusion or polyester pultrusion. The fiberglass provides low conductivity as opposed to metal reinforcing as used in prior art trailers.

The present invention provides a thermally efficient refrigerated trailer construction which has minimized weight versus prior art trailers.

If the structure of the present invention is used for a dry freight trailer, aluminum skins can be used for the sidewalls 38, 40. A reduced weight dry freight trailer is provided by this construction.

While a preferred embodiment of the present invention is shown and described, it is envisioned that those skilled in the art may devise various modifications of the present invention without departing from the spirit and scope of the appended claims.

The invention claimed is:

1. A trailer having a predetermined length comprising:
   a floor;
   a pair of sidewalls extending upwardly from said floor, each of said sidewalls including an inner skin, an outer skin, and a core provided between said inner and outer skins, said sidewalls having a top; and
   a plurality of posts provided between said inner and outer skins, each of said posts having a predetermined height relative to said top of each of said sidewalls, the heights of said posts varying along a predetermined pattern along the length of the trailer.

2. A trailer as defined in claim 1, wherein a landing gear is provided underneath a front portion of said floor, and an undercarriage assembly is provided underneath a rear portion of said floor, wherein the posts which are above said landing gear and above said undercarriage assembly are longer than the posts between said landing gear and said undercarriage assembly.

3. A trailer as defined in claim 2, further including at least one reinforcement mounted at a predetermined position above selected ones of said posts which are between said landing gear and said undercarriage assembly, said reinforcements being vertically aligned with said respective selected ones of said posts and being provided between said inner and outer skins.

4. A trailer as defined in claim 1, wherein each of said posts is generally Z-shaped.

5. A trailer as defined in claim 1, wherein each of said posts spans the thickness of the respective sidewall along at least a predetermined portion thereof.

6. A trailer as defined in claim 5, wherein each of said side walls further includes a sealing member attached to said floor and to said inner skin, each of said posts being attached to said sealing member and to said outer skin.

7. A trailer as defined in claim 6, wherein each of said posts is spaced apart from said inner skin a predetermined distance, and said core is provided between each of said posts and said inner skin.

8. A trailer as defined in claim 1, wherein each of said posts includes a first leg parallel to the inner and outer skins, a second leg extending perpendicularly to said first leg, and a third leg extending perpendicularly to said second leg and parallel to said first leg, said first leg being secured to said outer skin.

9. A trailer as defined in claim 8, wherein each of said side walls further includes a sealing member attached to said floor and to said inner skin, each of said posts being attached to said sealing member.

10. A trailer as defined in claim 9, wherein said third leg is spaced apart from said inner skin a predetermined distance, and said core is provided between said third leg and said inner skin.

11. A trailer as defined in claim 1, wherein each of said posts has a cutout at a top end thereof.

12. A trailer as defined in claim 1, wherein predetermined ones of said posts have a cutout at a top end thereof.

13. A trailer as defined in claim 1, further including a pair of lower rails, respective lower rails connecting a respective sidewall to said floor, said outer skin of each of said sidewalls overlapping an outer surface of said lower rail.

14. A trailer as defined in claim 13, wherein on each of sidewalls, said outer skin, said lower rail and each of said posts are connected together by at least one fastener.

15. A trailer as defined in claim 14, wherein each of said posts includes a first leg parallel to the inner and outer skins, a second leg extending perpendicularly to said first leg, and a third leg extending perpendicularly to said second leg and parallel to said first leg, and wherein said at least one fastener extends through said first leg of each said post.

16. A trailer as defined in claim 14, wherein on each of said sidewalls further including at least one fastener secured through said outer skin and each of said posts at a predetermined position above a top end of said lower rail.

17. A trailer as defined in claim 13, further including a backing member secured to each of said posts, and wherein on each of said sidewalls, said outer skin, said lower rail, each said posts and each of said backing members are connected together by at least one fastener.

18. A trailer as defined in claim 17, wherein each of said posts includes a first leg parallel to the inner and outer skins, a second leg extending perpendicularly to said first leg, and a third leg extending perpendicularly to said second leg and parallel to said first leg, and wherein said at least fastener extends through said first leg of each said post.

19. A trailer as defined in claim 17, wherein each of said sidewalls further including at least one fastener secured through said outer skin, each of said posts and each said of members at a predetermined position above a top end of said lower rail.

20. A trailer as defined in claim 1, wherein each said skin is made of fiberglass.

21. A trailer as defined in claim 20, wherein each said core is made of foamed thermoset plastic.

22. A trailer as defined in claim 21, wherein said foamed thermoset plastic is a urethane foam.

23. A trailer as defined in claim 1, wherein said inner skin is formed from fiberglass and said outer skin is formed from metal.

24. A trailer as defined in claim 23, wherein said core is made of foamed thermoset plastic.

25. A trailer as defined in claim 24, wherein said foamed thermoset plastic is a urethane foam.

* * * * *